United States Patent [19]

Zhou et al.

[11] Patent Number: 5,859,929
[45] Date of Patent: Jan. 12, 1999

[54] SYSTEM FOR CHARACTER PRESERVING GUIDELINES REMOVAL IN OPTICALLY SCANNED TEXT

[75] Inventors: Jing Zhou, Charlotte, N.C.; Yang He, Bethel, Conn.

[73] Assignee: United Parcel Service of America, Inc., Atlanta, Ga.

[21] Appl. No.: 566,002

[22] Filed: Dec. 1, 1995

[51] Int. Cl.$^6$ ........................................ G06K 9/48
[52] U.S. Cl. .................. 382/175; 382/197; 382/202
[58] Field of Search .................... 382/190, 197, 382/198, 199, 200, 202, 178, 179, 175

[56] References Cited

U.S. PATENT DOCUMENTS

| | | | |
|---|---|---|---|
| 3,201,752 | 8/1965 | Rainbow | 382/179 |
| 4,292,622 | 9/1981 | Henrichon, Jr. | 382/177 |
| 5,050,222 | 9/1991 | Lee | 382/197 |
| 5,101,448 | 3/1992 | Kawachiya et al. | 382/117 |
| 5,111,514 | 5/1992 | Ohta | 382/173 |
| 5,129,012 | 7/1992 | Abe | 382/190 |
| 5,202,933 | 4/1993 | Bloomberg | 382/173 |
| 5,204,915 | 4/1993 | Nishida | 382/197 |
| 5,572,602 | 11/1996 | Naoi et al. | 382/178 |

FOREIGN PATENT DOCUMENTS

| | | |
|---|---|---|
| 60-33678 | 2/1985 | Japan . |
| 2171977 | 3/1990 | Japan . |
| 2-231690 | 9/1990 | Japan . |
| 2-250193 | 10/1990 | Japan . |
| 2-228779 | 11/1990 | Japan . |
| 3-113582 | 5/1991 | Japan . |
| 3-160582 | 7/1991 | Japan . |
| 3-209588 | 9/1991 | Japan . |
| 3-282791 | 12/1991 | Japan . |
| 4-111188 | 4/1992 | Japan . |
| 4-165582 | 6/1992 | Japan . |
| 4-329493 | 11/1992 | Japan . |
| 5-54189 | 3/1993 | Japan . |

OTHER PUBLICATIONS

Karasturi et al., "A system for interpretation of line drawings," IEEE Transactions on Pattern Analysis and Machine Intelligence, vol. 12, No. 10.

Gloger, J.M., "Use of the Hough Transform to Separate Merged Text/Graphics in Forms," *IAPR International Conference on Pattern Recognition Proceedings*, pp. 268–271 (1992)

Huggett et al., "Pseudo 2–Dimensional Hidden Markov Models for Document Restoration," *IEE Colloquium on Document Image Processing and Multimedia Environments*, pp. 10/1–6 (Nov. 2, 1995).

Gloger, J. M., "Hough Transform Based Elimination of Auxiliary Lines in Addresses," *US Postal Service Advance Tech. Conf.*, pp. 85–92 (Dec. 2, 1992).

Lo et al., "Gray–Scale Hough Transform for Thick Line Detection in Grey–Scale Images," *Pattern Recognition*, vol. 28, No. 5, pp. 647–660 (May 1995).

Baird, H. S., "Feature Identification for Hybrid/Statistical Pattern Classification," *Proc. Computer Vision and Pattern Recognition*, pp. 150–155 (Jun. 1986).

Van Veen et al., "Discretization Errors in the Hough Transform," *Pattern Recognition*, vol. 14, No. 1–6, pp. 137–145 (1981).

J.M. Gloger, Daimler Benz AG, Research Center Ulm, "A Hough Transform Based Elimination of Auxiliary Lines in Address," pp. A–85—A 92.

*Primary Examiner*—Jon Chang
*Attorney, Agent, or Firm*—Jones & Askew, LLP

[57] ABSTRACT

An efficient system and method for reliably identifying guidelines, ruled lines, and the like, in images of text, and distinguishing those portions of such lines which touch or intersect character strokes in the image. The system provides for removal of guideline segments between character strokes without deleting character strokes. The system operates effectively on both machine printed and hand formed text. An image of text has most characters separated for more effective subsequent OCR processing, despite the presence of guidelines connecting the characters.

25 Claims, 12 Drawing Sheets

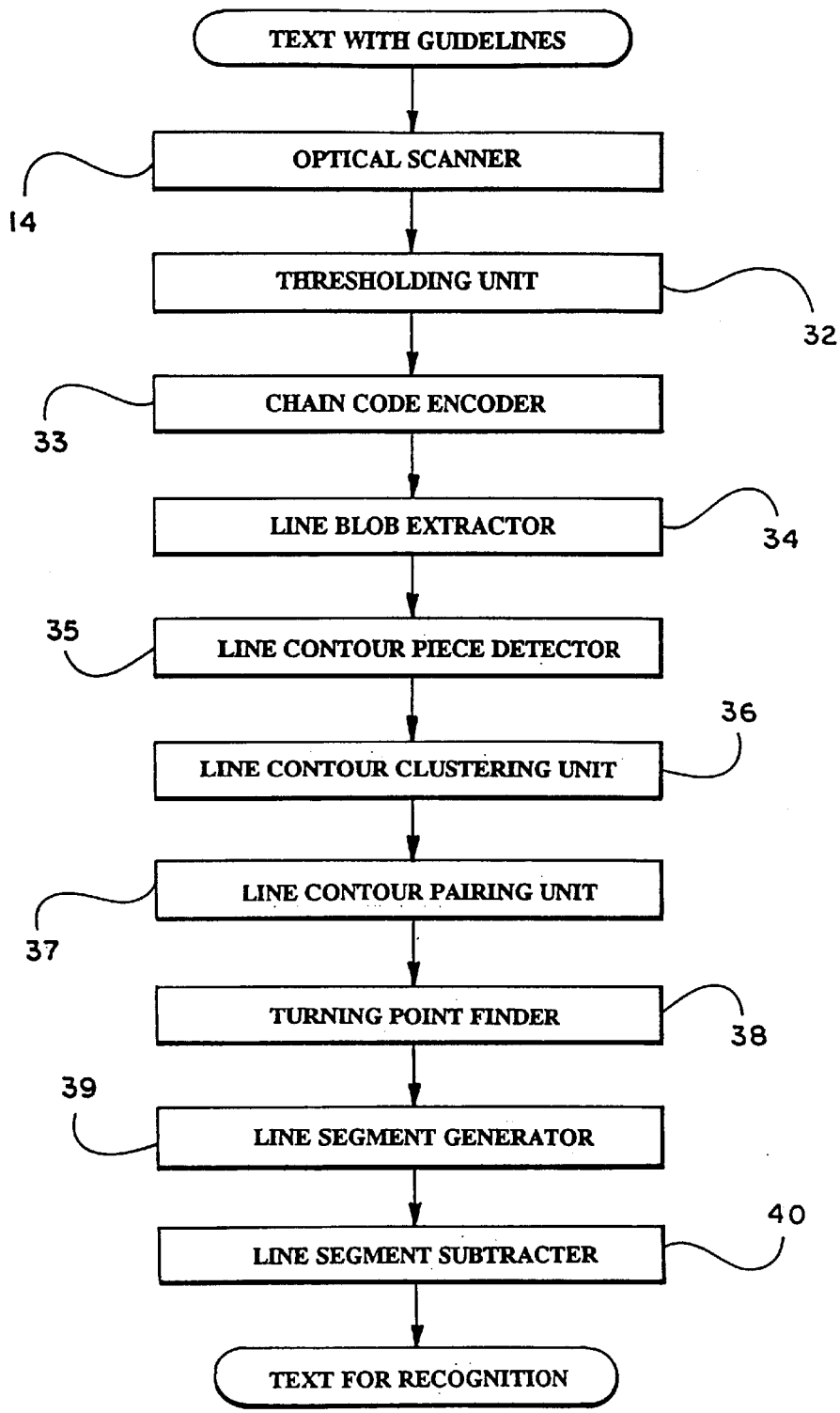
Fig_1

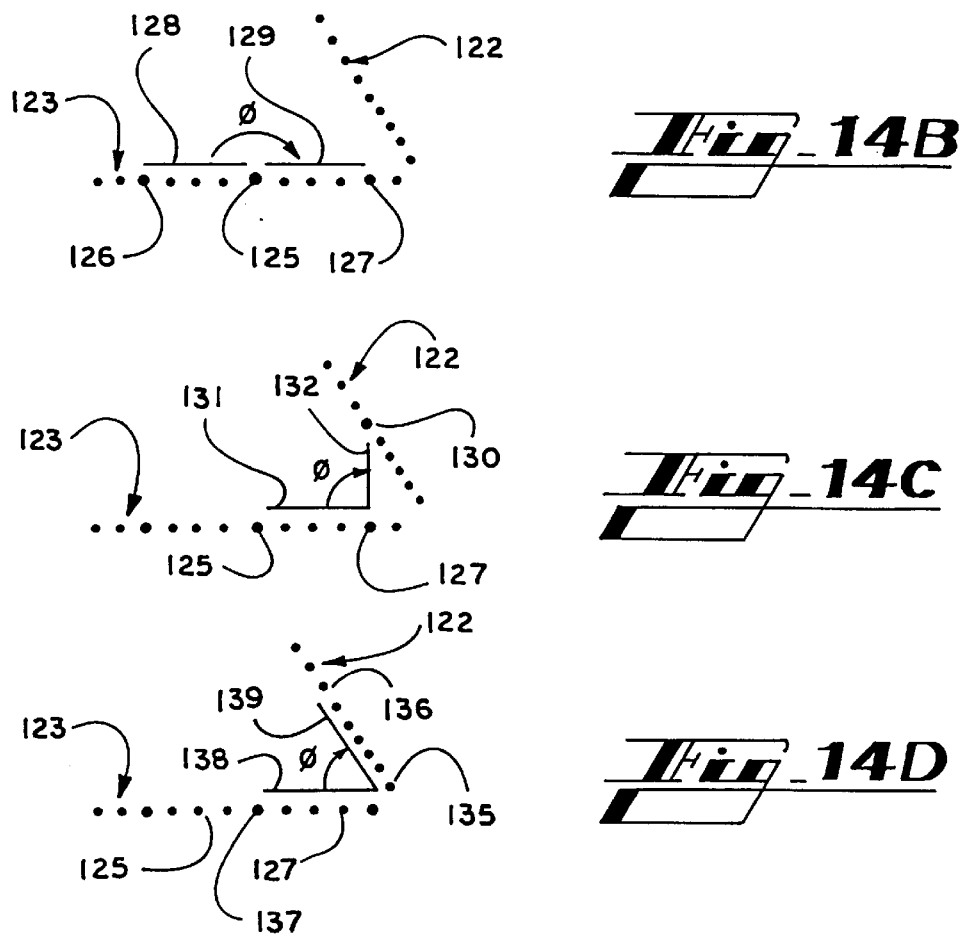
Fig_14B
Fig_14C
Fig_14D
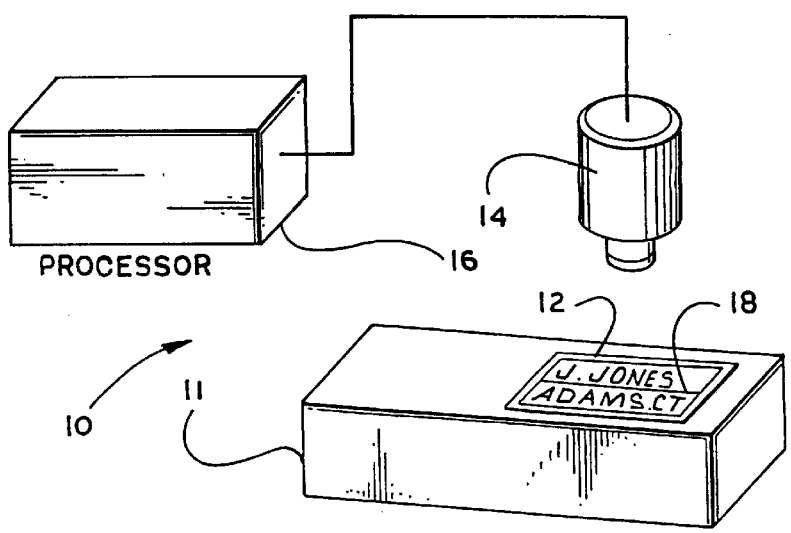
Fig_2

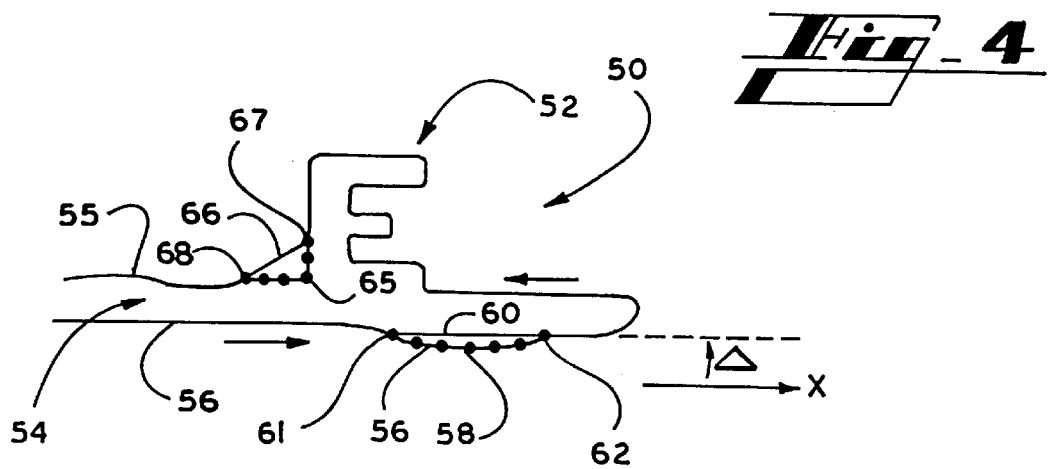
Fig_4
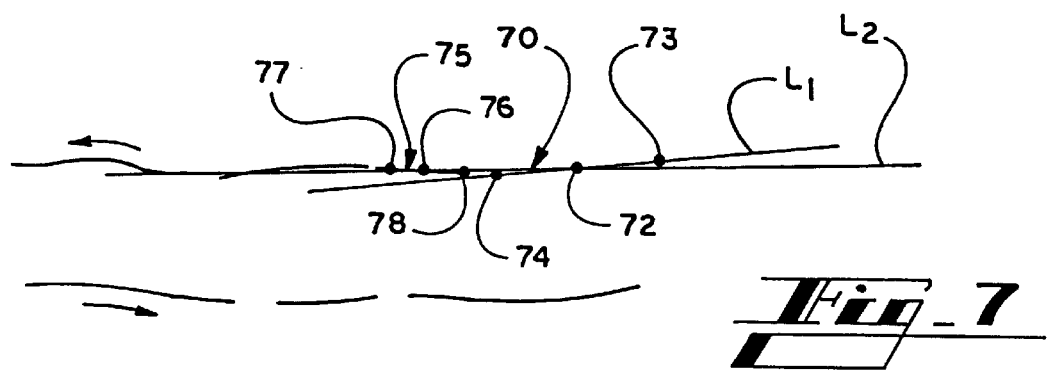
Fig_7
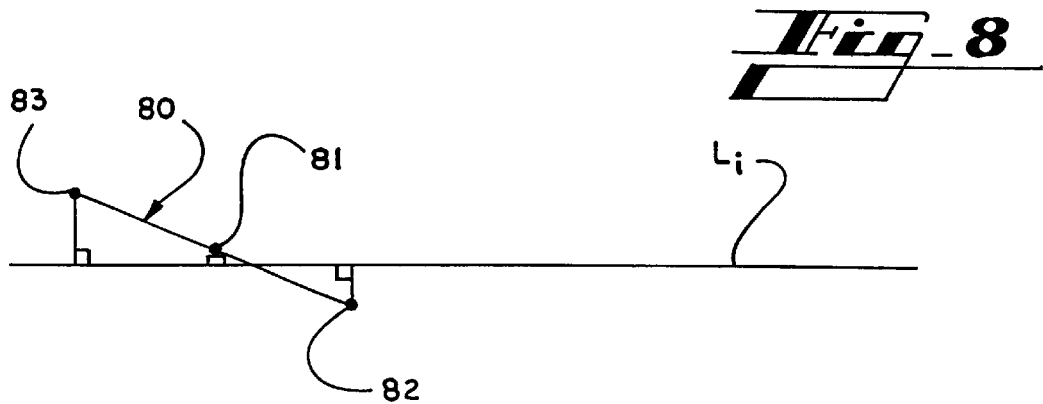
Fig_8

FIG. 5
(A) 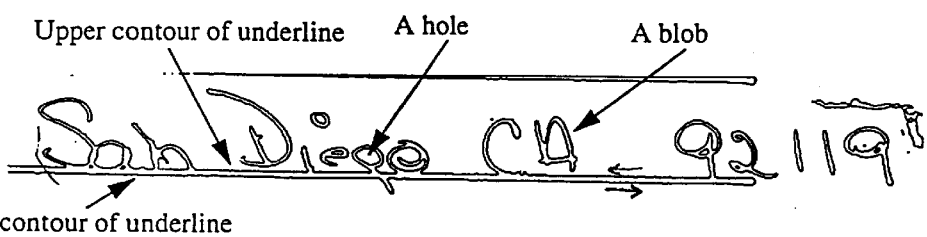
(B) 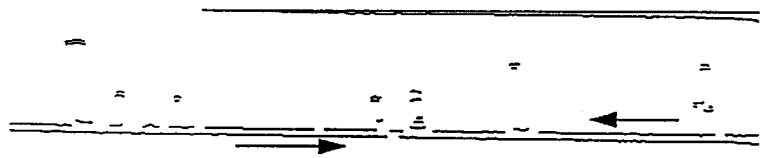
(C) 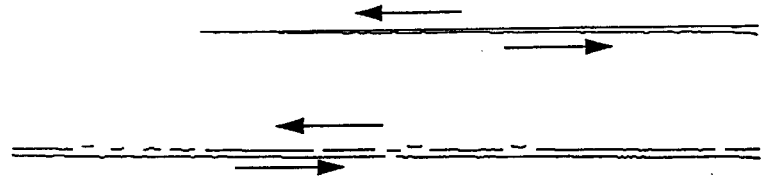
(D) 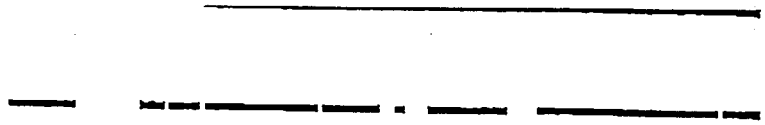
(E)
(F)

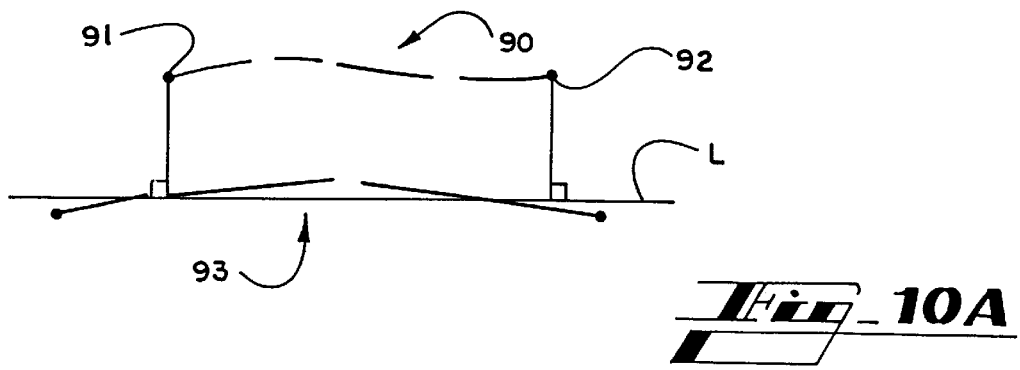
*Fig_10A*
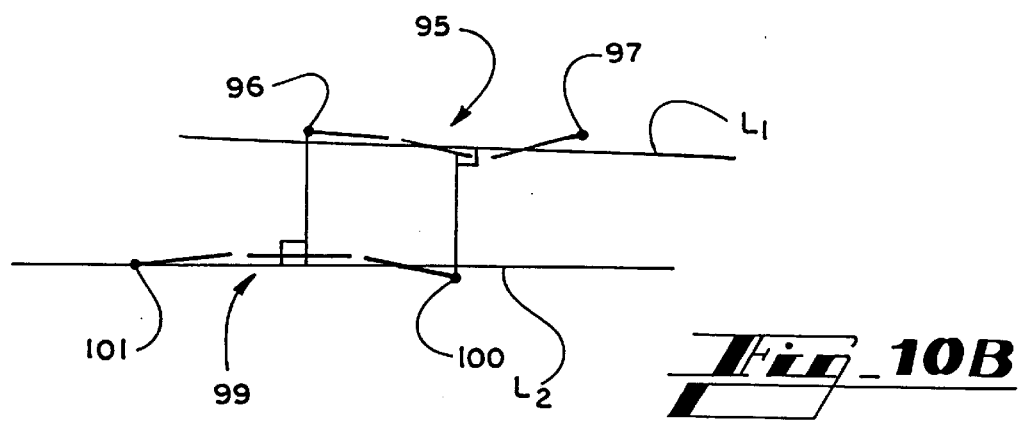
*Fig_10B*
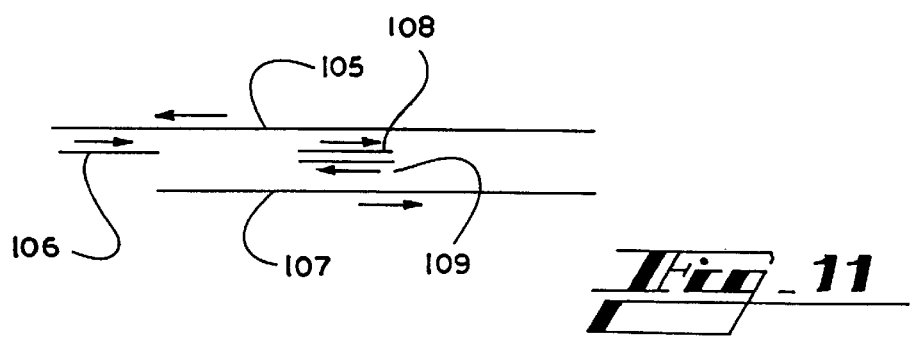
*Fig_11*
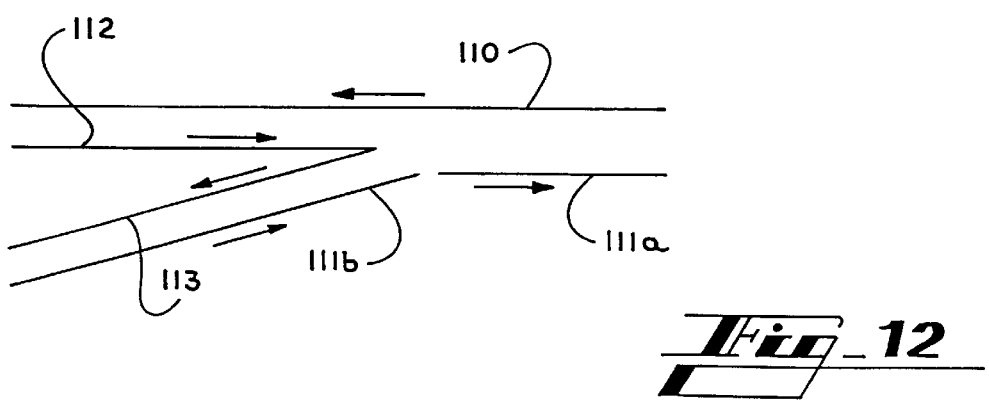
*Fig_12*

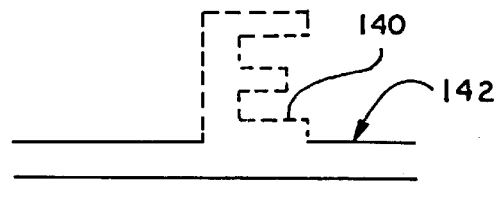
Fig_15
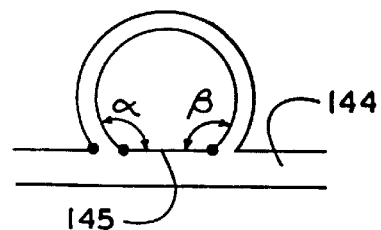
Fig_16A
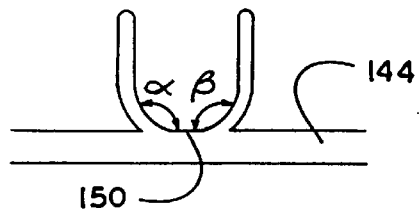
Fig_17
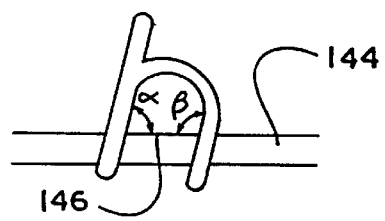
Fig_16B
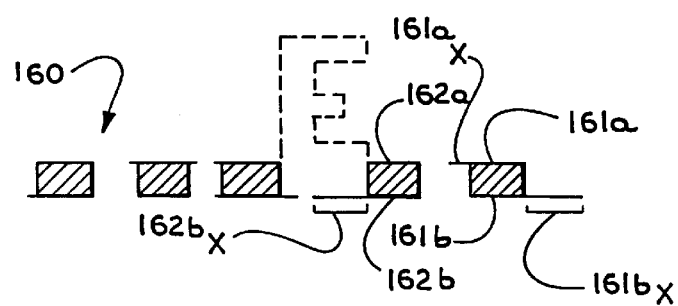
Fig_18

SYSTEM FOR CHARACTER PRESERVING GUIDELINES REMOVAL IN OPTICALLY SCANNED TEXT

TECHNICAL FIELD

This invention relates to optical character recognition (OCR) of printed text, and more particularly relates to a system and method for removing line patterns such as underlines and guidelines from an optically scanned image of machine printed or handwritten text, without removing portions of characters intersected by the lines.

BACKGROUND ART

Most optical character recognition (OCR) systems and handwriting recognition methods treat each character as a single connected object, especially when character segmentation is involved. The text may be printed or written on a form or label providing guidelines that touch the characters; or, the writer may underline portions of the text with a line that intersects the characters. Also, a line may be superimposed unintentionally onto a label, for example, during handling of a package. Studies have found that over 35% of handwritten addresses on parcels have at least one character touching a guideline. When they connect characters, such lines make it difficult for recognition systems to identify the individual characters as separate objects.

Some prior systems simply detect the whole guideline and remove it from the original image of the text. This often removes part of character strokes and, therefore, breaks the connectivity of the characters. For example, if an underline touches a "U" at its bottom curve and the system removes the entire underline, the "U" may be broken and recognized as two "I"s.

Other prior systems have attempted to separate characters in an image from ruled lines that contact characters. An example of such a system, which examines prospective contact positions of a character and a ruled line, is described in Japanese Kokai Patent Application No. Hei 3[1991]-160582. Such systems may have difficulty when the ruled line varies in thickness, when its direction is not very close to horizontal, when it branches into multiple lines, or when it bends significantly. Such systems may also be more suited to machine printed characters and less capable of dealing with handwritten characters.

Thus, there has been a need in the art for a system and method for reliably identifying guidelines, ruled lines, frames, and the like, in images of text, even when such lines vary in thickness and direction, and when the lines touch text that is machine or hand formed. There also has been a need in the art for removing such lines while preserving all of the character strokes of the text.

SUMMARY OF THE INVENTION

The present invention solves the above-described problems in the art by providing an efficient system and method for reliably identifying line patterns, such as guidelines, ruled lines, frames, and the like, in images of text, and distinguishing those portions of such lines that touch or intersect character strokes in the image from the character strokes. The present invention provides for removal of guideline segments between character strokes without deleting character strokes. The system and method operate effectively on both machine printed and hand formed text. A system according to the invention separates most characters for more effective subsequent OCR processing, despite the presence of guidelines connecting the characters.

The present invention utilizes the contours of objects, such as characters of text, in an image. The contour of an object in an image is the outer boundary of the object. Contour pieces are segments of the contour.

Generally described, the present invention provides a system and method for identifying a line pattern in an image of text, comprising locating contours of isolated objects in the image; locating line contour pieces in the contours comprising contiguous pixels forming lines of at least a predetermined straightness along at least a first predetermined length; designating clusters of the line contour pieces which have at least a first predetermined closeness along a longitudinal direction generally along the length of the line contour pieces and essentially no transverse overlap; and locating pairs of the clusters which are spaced apart transversely and have at least at a second predetermined closeness to one another generally along a direction transverse to the longitudinal direction. The preferred system chain encodes isolated objects to locate their contours. Line contour pieces are preferably located by determining pieces of the chain code in which successive short segments form angles with the longitudinal direction less than a predetermined line piece angle threshold. Clusters are preferably designated by selecting an initial line contour piece, designating the initial piece as an initial cluster, and expanding the initial cluster by adding line contour pieces whose distance from the cluster is less than the first predetermined closeness. The distance from a contour piece to a cluster is preferably defined as the distance from the contour piece to a straight line fit to points of the cluster.

According to further aspect of the present invention, a method and system for removing a line pattern from an image of text is provided, comprising locating contours of isolated objects in the image; locating line contour pieces in the contours comprising contiguous pixels forming lines of at least a predetermined straightness along at least a first predetermined length; designating clusters of the line contour pieces which have at least a first predetermined closeness along a longitudinal direction generally along the length of the line contour pieces and essentially no transverse overlap; locating pairs of the clusters which are spaced apart transversely and have at least at a second predetermined closeness to one another generally along a direction transverse to the longitudinal direction; eliminating from the clusters those contour pieces that intersect character strokes; and removing from the image pixels bounded by the paired clusters. Eliminating contour pieces that intersect character strokes preferably comprises finding intersection angles between a contour piece and strokes that connect to it at its ends; and designating the contour piece either part of a line pattern or part of a character, responsive to predetermined relationships between the intersection angles, the length of the contour piece, and the distance from the contour piece to the cluster to which it belongs. Removing from the image pixels bounded by the paired clusters preferably comprises filling in space between the paired clusters and removing from the image the filled space and bordering portions of the clusters.

Thus, it is an object of the present invention to provide an improved method and system for identifying lines in images of text.

It is a further object of the present invention to provide an improved method and system for removing lines from images of text while preserving character strokes.

It is a further object of the present invention to provide an improved method and system for preparing images of text including line pattern for OCR processing.

Other objects, features and advantages of the present invention will become apparent upon reviewing the following description of preferred embodiments of the invention, when taken in conjunction with the drawing and the appended claims.

BRIEF DESCRIPTION OF THE DRAWING FIGURES

FIG. 1 is a system flowchart outlining the steps of the technique of the present invention for character-preserving line pattern removal.

FIG. 2 is a diagrammatic view of an imaging system embodying the present invention.

FIG. 4 illustrates diagrammatically a portion of a contour of a blob which includes a character touching an underline, and the formation of line segments for assigning angles to pixels along the contour to create an angle map.

FIG. 5A illustrates diagrammatically an example of a binary image of text including an underline touching characters and an overline.

FIG. 5B illustrates diagrammatically a chain encoded image of the binary image of FIG. 5A.

FIG. 5C illustrates diagrammatically line contour pieces detected in the chain encoded image of FIG. 5B.

FIG. 5D illustrates diagrammatically clusters formed from the line contour pieces of FIG. 5C.

FIG. 5E illustrates diagrammatically the line segments to be removed from the original image.

FIG. 5F illustrates diagrammatically binary image of the text with the line segments removed.

FIG. 7 illustrates diagrammatically the formation of fitted lines utilized in the clustering process of FIG. 7.

FIG. 8 illustrates diagrammatically the measurement of the distance between a line segment and a cluster utilized in the clustering process of FIG. 7.

FIGS. 10A–10B illustrate diagrammatically the measurement of the distance between two clusters in the process of FIG. 9.

FIG. 11 illustrates diagrammatically a set of clusters to which pairing rules of the process of FIG. 9 are applied.

FIG. 12 illustrates diagrammatically a set of clusters having contour pieces whose cluster membership is changed during the pairing process of FIG. 9.

FIGS. 14B–14C illustrate diagrammatically the process of FIG. 13 for locating a turning point and intersecting angle.

FIG. 15 illustrates diagrammatically a first character-preserving rule of the process of FIG. 13.

FIGS. 16A–16B illustrate diagrammatically a second character-preserving rule of the process of FIG. 13.

FIG. 17 illustrates diagrammatically a third character-preserving rule of the process of FIG. 13.

FIG. 18 illustrates diagrammatically the connecting of paired clusters and filling of line segment regions.

DETAILED DESCRIPTION

Figure 3:
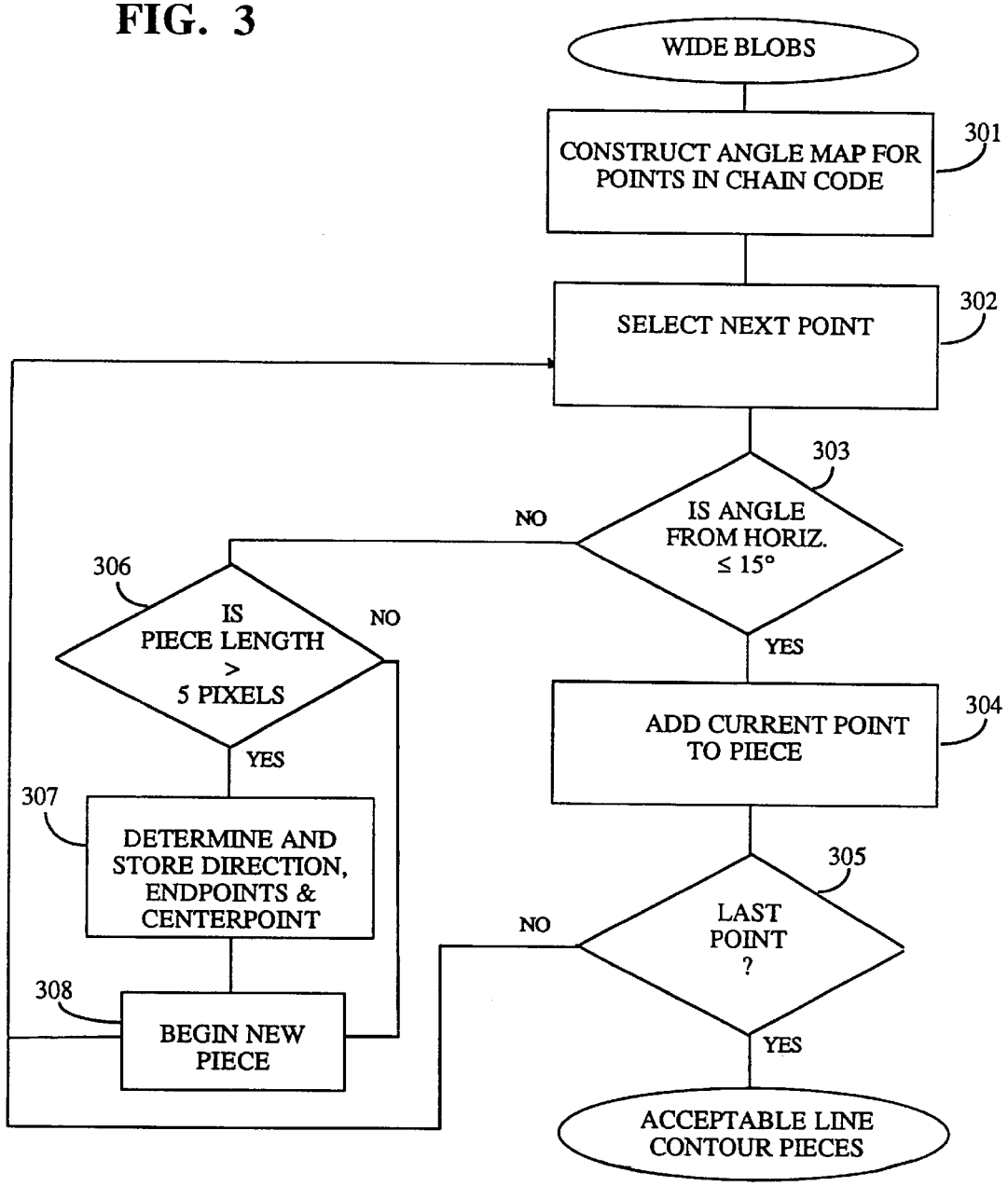
FIG. 3 is a flowchart of the line contour piece detector of FIG. 1.

Turning first to the nomenclature of the specification, the detailed description which follows is represented largely in terms of processes and symbolic representations of operations performed by conventional computer components, including a central processing unit (CPU), memory storage devices for the CPU, and connected pixel-oriented display devices. These operations include the manipulation of data bits by the CPU and the maintenance of these bits within data structures resident in one or more of the memory storage devices. Such data structures impose a physical organization upon the collection of data bits stored within computer memory and represent specific electrical or magnetic elements. These symbolic representations are the means used by those skilled in the art of computer programming and computer construction to most effectively convey teachings and discoveries to others skilled in the art.

For the purposes of this discussion, all or a portion of a process may be a sequence of computer-executed steps leading to a desired result. These steps generally require physical manipulations of physical quantities. Usually, though not necessarily, these quantities take the form of electrical, magnetic, or optical signals capable of being stored, transferred, combined, compared, or otherwise manipulated. It is conventional for those skilled in the art to refer to these signals as bits, values, elements, symbols, characters, terms, objects, numbers, records, files or the like. It should be kept in mind, however, that these and similar terms should be associated with appropriate physical quantities for computer operations, and that these terms are merely conventional labels applied to physical quantities that exist within and during operation of the computer.

It should also be understood that manipulations within the computer are often referred to in terms such as adding, comparing, moving, etc. which are often associated with manual operations performed by a human operator. It must be understood that no such involvement of a human operator is necessary or even desirable in the present invention. The operations described herein are machine operations performed in conjunction with a human operator or user who interacts with the computer. The machines used for performing the operation of the present invention include general purpose digital computers, work stations or other similar computing devices.

In addition, it should be understood that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory.

Referring now in more detail to the drawing, in which like numerals refer to like parts throughout the several views, FIG. 1 shows a system flowchart of the computer-implemented method of line pattern identification and removal carried out by a system according to the present invention. The method may be used, for example, to identify those portions of an image that constitute line patterns, underlines, overlines, ruled lines, and the like. It may also be used to identify parts of such lines that fall between characters touched by the lines, and to remove such parts while preserving the characters in full for OCR processing.

Referring now to FIG. 2, the present invention may be embodied in an imaging system 10 for acquiring an image of a label 12 attached to a parcel 11 moving along a conveyor 15. The label 12 bears characters printed within a guideline grid 18 which touches some of the characters. An optical scanning camera 14, preferably incorporating a CCD detector, is positioned over the path of the parcel 11. The camera 14 is operated in a known manner to acquire an image of the label 12. Alphanumeric characters in the image are subject to analysis in a processor 16, which may be, for example, a SPARC2 or other suitable Unix workstation programmed in C++ language. The processor 16 is configured to carry out the method of the present invention. The processor may include an OCR engine, which may be one of several known in the art. The OCR engine attempts to identify the characters and to segment them into words. Output devices (not shown) may be connected to the processor to display, transmit, or print the result of the OCR analysis as well as any intermediate data the user wishes to review, such as the various image data shown in FIGS. 5A–5F. One imaging system suitable for acquiring images of characters is disclosed in U.S. Pat. No. 5,308,960, which is incorporated herein by reference.

FIG. 1 summarizes the flow of information pursuant to the technique of the present invention, described in detail below. The optical scanner 14 acquires a grey scale image of the label containing the text and guideline grid. The image is stored in a digital memory associated with the processor 16, and an adaptive thresholding program 32 of a type known in the art is applied to produce a binary image, as shown in FIG. 5A. Each isolated object in the binary image is represented by a blob. Each isolated background region circled by a blob is called a hole of that blob. A chain code encoder 33 using the well known principle described, for example, in A. Jain, *Fundamentals of Digital Image Processing*, Prentice Hall 1989, citing H. Freeman, "Computer Processing of Line Drawing Images," *Computer Surveys* 6 (March 1974:57–98, is used to represent connected components in the binary image. The chain code for a blob is a sequence of directions from one pixel on the blob contour to the next which follow the blob contour counterclockwise and the hole contour clockwise. FIG. 5B shows the chain encoded image corresponding to the binary image of FIG. 5A. The direction of the chain code for pixels on the upper contour of a blob collectively have a direction toward the left, and on the lower contour of a blob collectively toward the right, as shown by the arrows adjacent to the underline contours in FIG. 5B.

A line blob extractor 34 is used to extract only those blobs which are likely to contain a line pattern. The blob with the longest dimension in the image is located, and the image is rotated to align the length of the longest blob with the rows of the image matrix (pixel rows) in memory. The orientation of the rows of the matrix will sometimes be referred to as the x axis of the image, and the orientation of the columns as the y axis. Image rotation techniques are known in the art. One suitable image rotation technique is described in commonly owned co-pending U.S. application Ser. No. 08/507,793, filed Jul. 25, 1995, which is incorporated herein by reference. After rotation, blobs with a width along the x axis less than a predetermined threshold, for example, 150 pixels (or about one-half inch for a 250 dpi CCD detector) are filtered out as unlikely to be part of a line pattern. This filtering reduces the data to be processed further and reduces noise during line boundary detection.

Next, a line contour piece detector 35 (described below with reference to FIG. 3) locates contiguous pixels along the contours for each pixel in the chains to find pieces that are sufficiently close to horizontal (x axis) and sufficiently long. The detected line pieces are shown in FIG. 5C.

Then, a line contour clustering unit 36 (described below with reference to FIG. 6) clusters the detected line pieces into underline contours. Line pieces chain coded in a similar direction (left or right) are accumulated into clusters by adding pieces that are close enough to the cluster and not vertically overlapped with any piece in the cluster. Short clusters are eliminated from consideration as parts of guidelines. The surviving clusters are shown in FIG. 5D.

Next, a line contour pairing unit 37 (described below with reference to FIG. 9) pairs left-directed clusters with lower, right-directed clusters that pass a closeness threshold. The result estimates the global shape of the guideline and deals with cases where the guideline has a varying width, bends, or branches. Character preservation then is implemented by a turning point finder 38 and a line segment generator 39 (described below with reference to FIG. 13) which eliminate from the guideline shapes those areas that are likely to be part of characters, according to predetermined rules. At each turning point for a line piece determined to be part of a character, a line is drawn from the upper contour piece to the lower piece of the paired clusters to define regions corresponding to segments of the guideline to be removed. These regions are filled with foreground pixels by a boundary-to-region decoding method of a type known in the art. The resulting segments to be removed are shown in FIG. 5E.

The final step is to subtract in a known manner the guideline segments from the original image of FIG. 5A using a line segment subtractor 40. The resulting modified binary image is shown in FIG. 5F. The isolated guideline at the top of the image is removed, and the underline touching the characters is removed without breaking any characters. The characters are now isolated for OCR analysis, except for two which themselves overlap.

Parts of the system will now be described in more detail.

Line Contour Piece Detector

FIG. 3 is a flow diagram illustrating the steps of the line contour piece detector 35 carried out by the processor 16. Locating line contour pieces is known in the art of image processing and computer vision for purposes such as edge detection and line finding. The subroutine of FIG. 3 extracts from the output of the blob extractor 34 acceptable line contour pieces. First, an angle map is formed at step 301 by calculating an angle for each pixel in the chain encoded image. This is illustrated in FIG. 4, which shows a portion of a blob 50 in which a character 52 ("E") touches an underline 54. The contour of the blob 50 includes a upper portion 55 with a chain code directed to the left, and a lower portion 56 with a chain code directed to the right. To assign an angle to each pixel, such as pixel 58, a line 60 is defined passing through a pixel 61 three pixels behind pixel 58, and a pixel 62 three pixels ahead of pixel 58. The distances between pixels is exaggerated in the drawing. The angle Δ between the line 60 and the horizontal x axis is assigned to pixel 58. Another example is shown for the case of a pixel 65 at the intersection of the upper contour 55 and the character 52. The line 66 is formed between the trailing pixel 67 and the leading pixel 68. It can be seen that the line 66 forms a much larger angle with the x axis than the angle assigned to pixel 58.

The complete angle map for all the blobs and holes is stored. Then, the angle map is examined to locate contiguous pixels, all the angles of which are smaller than a predetermined line piece angle threshold (for example: ±15° from the x axis). At step 302 in FIG. 3, a pixel is selected. At step 303, if the angle assigned to the pixel is within the line piece angle threshold, the pixel is added to the current line piece at step 304. If this was not the last pixel in the blob, as checked at step 305, the process returns to step 302 for selection of the next pixel in the chain. If, at step 303, a pixel's angle is greater than the threshold, at step 306 the length of the contiguous set of pixels having acceptable angles is tested against a predetermined line piece length threshold (for example: at least 5 pixels). Contiguous groups of pixels longer than the threshold are saved as line contour pieces at step 307, along with the direction of the piece, and its end and center points.

As the string of small angles has been broken, a new potential piece is begun at step 308. Its first member pixel will be the next pixel having an angle within the threshold. A new potential piece is also begun if at step 306 the current piece is shorter than the length threshold. Such short pieces are dropped from consideration as line contour pieces. The process of FIG. 3 results in a set of acceptable line contour pieces that are long enough and close enough to horizontal to be likely pieces of guidelines. The detected line contour pieces for the image of FIG. 5A are shown in FIG. 5C.

Line Contour Clustering Unit

Figure 6:
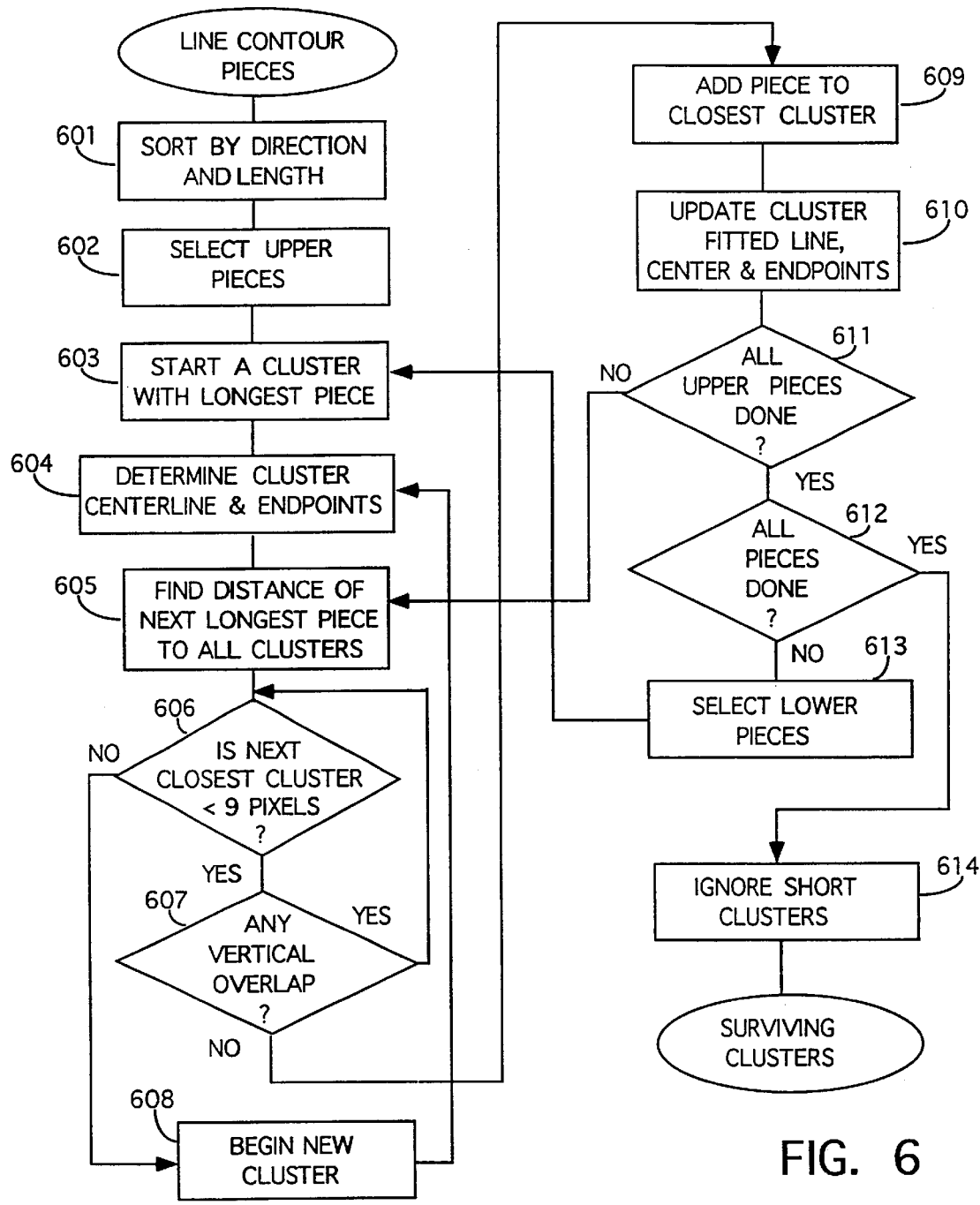
FIG. 6 is a flowchart of the line contour clustering unit of FIG. 1.

FIG. 6 is a flow diagram illustrating the steps of the line contour clustering unit 36 carried out by the processor 16. This subroutine clusters the detected line pieces into guideline contours. At step 601, all the detected line contour pieces from the detector 35 are sorted by direction and then by length in descending order. At step 602, the upper pieces are selected, and at 603 a cluster is started with the longest upper piece. A centerline, defined as a least square fitted line based on the piece's end points and center point, is calculated for the initial piece. Let $$\{(x_0^i, y_0^i), (x_1^i, y_1^i), (x_2^i, y_2^i)\}_{i=1}^N$$

denote the end point, center point, and end point of the i th contour piece of a cluster. The least square fitted centerline x=ay+b is defined to minimize the cost function:

$$J = \sum_{i=1}^N \{0.25\ (x_0^i - ay_0^i - b)^2 + 0.5\ (x_1^i - ay_1^i - b)^2 + 0.25\ (x_2^i - ay_2^i - b)^2\}\ l_i$$

where where $l_i$ is the length of the i th contour piece, a is the cluster slope and b is the cluster intercept. The cluster end points are always the outer end points of the last contour piece at each end of the cluster. At step 604, the centerline and end points of the cluster are determined and stored.

FIG. 7 illustrates a group of contour pieces from an image, including the longest contour piece 70. The center point 72 and end points 73 and 74 are used to calculate a fitted centerline $L_1$ of the initial cluster based on the single contour piece 70.

At step 605, the distance from all existing clusters (initially one) to the next longest piece in the sorted list is determined. The distance from a contour piece to a cluster is defined as the average distance from the two end points and the center point of the contour piece to the fitted centerline of the cluster. A penalty amount may be added to the distance based on the angle of the contour piece from the cluster centerline. The penalty may be, for example, one-half the angle in degrees. FIG. 8 illustrates a contour piece 80 in relation to a cluster centerline $L_j$. The perpendicular lines from the center point 81 and the end points 82 and 83 to $L_j$ are shown. The average length of these three perpendiculars is the distance from the piece 80 to the cluster of $L_j$. At step 606, the program determines whether the closest cluster to the contour piece being checked is within a predetermined distance (for example: <9 pixels). For example, if a contour piece is only 3 pixels from the cluster centerline, but forms an angle of 20 degrees with the centerline, then the adjusted distance would be $$3+(0.5*20)=13 \text{ pixels,}$$

which is above the threshold of 9 pixels, and the piece would not be added to the cluster.

If the distance to the contour piece is close enough, at step 607 the contour piece is checked to determine whether it vertically overlaps with any contour piece of the closest cluster. If not, the contour piece is added to the cluster at step 609.

If vertical overlap is found between the current contour piece and a piece of the closest cluster, at step 607, the process returns to step 606 to check the next closest cluster. This continues until a cluster is found that is close enough to the contour piece and has no vertical overlap, so that the contour piece is added to that cluster at step 609 as described above.

If, at step 606, next closest cluster is farther away than the threshold, then at step 608 a new cluster is begun using the current contour piece. The process returns from step 608 to step 604 where a centerline is established for the new cluster, and the steps continue as described above.

At step 610, the new end points and length of the enlarged cluster are stored, and the fitted centerline is updated according to the following method.

Variables $c_{ij}$ are initialized, $c_{ij}=0$ for i=1,2 and j=1,2,3. When the i th contour piece is assigned to the cluster, these variables are updated by:

$$c_{11}=c_{11}+l_i(0.25(y_0^i)^2+0.5(y_1^i)^2+0.25(y_2^i)^2)$$

$$c_{12}=c_{12}+l_i(0.25y_0^i+0.5y_1^i+0.25y_2^i)$$

$$c_{13}=c_{13}+l_i(0.25x_0^iy_0^i+0.5x_1^iy_1^i+0.25x_2^iy_2^i)$$

$$c_{21}=c_{12}$$

$$c_{22}=c_{22}+l_i$$

$$c_{23}=c_{23}+l_i(0.25x_0^i+0.5x_1^i+0.25x_2^i)$$

The updated cluster parameters can be calculated by:

$$a = \frac{c_{13}c_{22} - c_{12}c_{23}}{c_{11}c_{22} - c_{12}c_{21}}$$

$$b = \frac{c_{11}c_{23} - c_{13}c_{21}}{c_{11}c_{22} - c_{12}c_{21}}$$

This updating calculation gives the updated fitted centerline recursively. In FIG. 7, the updated centerline $L_2$ is shown fitted to two upper contour pieces, 70 and 75. The center point 76 and end points 77 and 78 of the piece 75 are used in the above formulae.

At step 611, if all the upper pieces have not been tested and added to clusters if appropriate, the process goes to step 605 to repeat the process for the next contour piece in the sorted list.

When all the upper contour pieces have been clustered at 611, a check is done at step 612 to determine if all the pieces have been processed. If not, at step 613 the lower contour pieces are selected and individually processed in accordance with steps 603 to 610 as described above for the upper pieces. When these are also completed, the process moves from step 612 to step 614 where clusters shorter than a threshold in total length are eliminated from consideration as part of a guideline. This threshold can be set by the user, and a default value of, for example, 90 pixels, may be used. The result of the routine of FIG. 6 is a set of surviving clusters, shown in FIG. 5D, which are both left-directed (upper) and right-directed (lower).

Line Contour Pairing Unit

Figure 9:
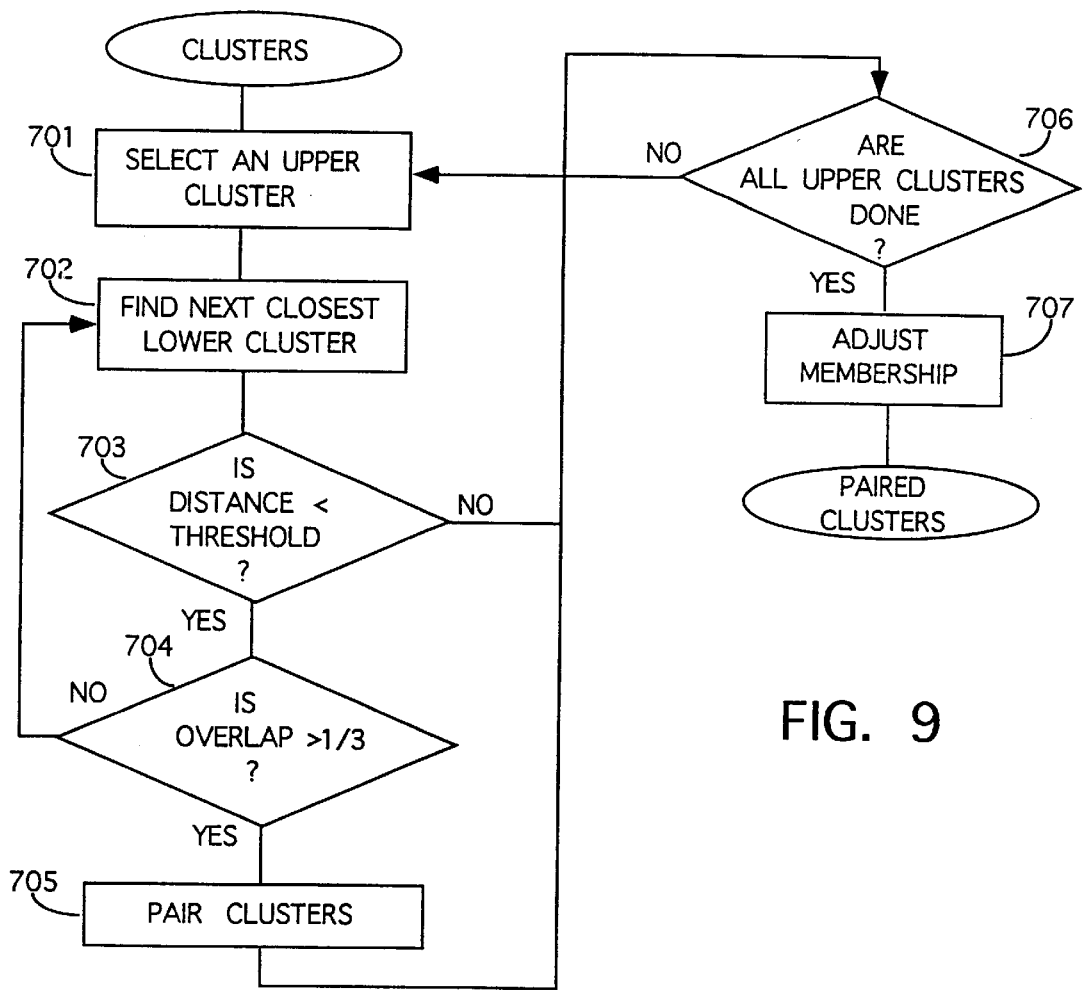
FIG. 9 is a flowchart of the line contour pairing unit of FIG. 1.

FIG. 9 illustrates the process carried out by the line contour pairing unit 37 of the present invention for pairing upper and lower clusters to define the global shape of the guidelines in the image. Beginning with the clusters created by the process of FIG. 6, at step 701 an upper, that is, left-directed, cluster is selected and its distance to all the lower or right-directed clusters positioned below the selected upper cluster is calculated at step 702, resulting in the identification of the closest lower cluster. The distance between two clusters is defined as the average distance between the left-most point and right-most point in one cluster and the fitted centerline in the other cluster. However, to be used, the left-most and right-most points of the one cluster must fall between the left-most and right-most points of the other cluster. This results in a symmetric distance from one cluster to another.

FIG. 10A illustrates how the distance is found between a cluster 90 and a longer cluster 93 which totally vertically overlaps the cluster 90. Perpendiculars are dropped from both extreme points 91 and 92 of cluster 90 to the centerline L of cluster 93. The average length of these perpendiculars is the distance between clusters 90 and 93. FIG. 10B illustrates how the distance is found between a cluster 95 and a cluster 99, which partially vertically overlap each other. Left-most point 96 of cluster 95 is positioned between the extreme points of cluster 99, and right-most point 100 of cluster 99 is positioned between the extreme points of cluster 95. The other respective extreme points, 97 and 101, do not lie over or under the other cluster. Therefore, the length of perpendiculars from points 96 and 100 to the respective centerlines $L_2$ and $L_1$ are averaged to determine the distance between the clusters.

At step 703 it is determined whether the distance from the selected upper cluster to the closest lower cluster is within a threshold (for example: <30 pixels). If so, at step 704 it is determined whether they overlap by at least a certain proportion, preferably at least one-third. If not, the process returns to step 702 to apply the tests of steps 703 and 704 to the next closest lower cluster.

FIG. 11 illustrates a set of three clusters 105, 106 and 107 from a guideline. Clusters 108 and 109 result from a hole in the guideline. If cluster 108 is the closest right-directed cluster to upper cluster 105, they would not be paired because of the minimal overlap between them. For the same reason, cluster 109 would not be paired with cluster 107. Although lower cluster 106 is closer to the upper cluster 105 than the lower cluster 107, cluster 106 does not overlap enough of cluster 105. Therefore, clusters 105 and 107 would be paired. However, when two clusters are both within the closeness threshold and they have no vertical overlap, they can be joined into a single cluster and paired with the corresponding opposite direction cluster. Therefore, clusters 106 and 107 would be joined and paired with cluster 105.

If the tests at step 704 are passed, the two clusters are marked as paired at step 705. A pair of clusters identify the upper and lower contours of a portion of a guideline. If the guideline is bent significantly, the multiple clusters will be linked into two pairs.

After step 705, or if the distance threshold test at step 703 is failed, the process goes to step 706 to determine whether all the upper clusters have been considered for pairing. If not, another upper cluster is selected at step 701 and the process continues. If all are done, the results are checked for errors at branches at step 707 labeled "Adjust Membership." FIG. 12 illustrates a situation in which a branching of a guideline may result in improper pairing. An upper cluster 110 will initially be paired with a lower cluster 111 consisting of two line pieces 111a and 111b. The cluster 110 was not paired with closer lower cluster 113 because of the relative length and overlap rules applied at step 704. This initial pairing of clusters 110 and 111 misses the fact that the guideline has a branch. At step 707, the image is searched for sets of two small clusters that lie between the members of a large pair and that are "upside down", that is, they consist of a right-directed cluster (such as cluster 112) over a left-directed cluster (cluster 113). When this situation is found, the line contour piece 111b is removed from cluster 111, and is replaced by the right-directed cluster 112 of the small set. After cluster 111 is updated with a new fitted centerline, it will be paired with cluster 110. The removed piece 111b will be assigned to a new lower cluster, and its new centerline will result in pairing with the upper cluster 113. In this way, the branch of the guideline is defined.

Turning Point Finder and Line Segment Generator

Figure 13A:
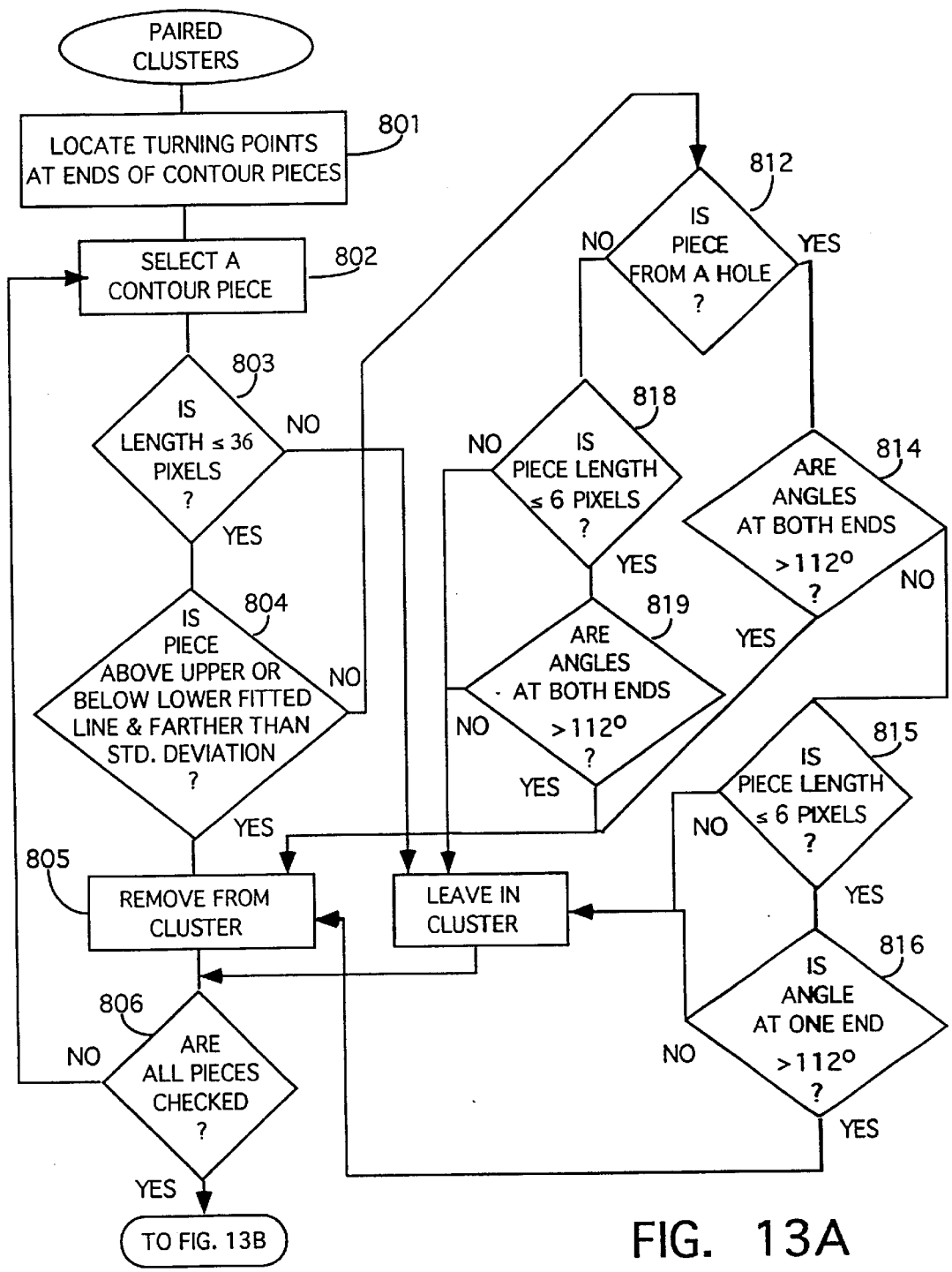
FIG. 13 is a flowchart of the turning point finder and line segment generator of FIG. 1.
Figure 13B:
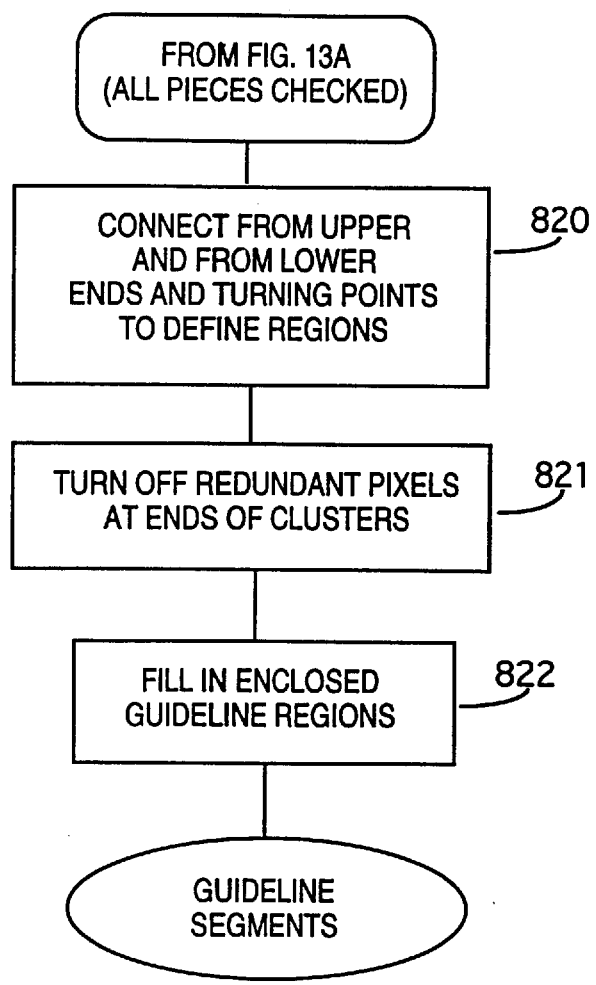

FIGS. 13A–13B illustrate the functions of the turning point finder 38 and the line segment generator 39 of the present system. An important function of these components is to preserve characters by locating line contour pieces that are on both a guideline and a character stroke. These pieces will not be removed with the rest of the guideline so that no gaps in characters will be created. Character preserving rules, shown in detail in FIGS. 13A–13B are based on the following features of the guideline patterns and the strokes which overlap characters: (1) the length of the contour piece; (2) the distance from the contour piece to the cluster to which it belongs as compared to the standard deviation of the distances of all pieces to the cluster, and (3) the intersection angles at the two ends of the contour piece.

Figure 14A:
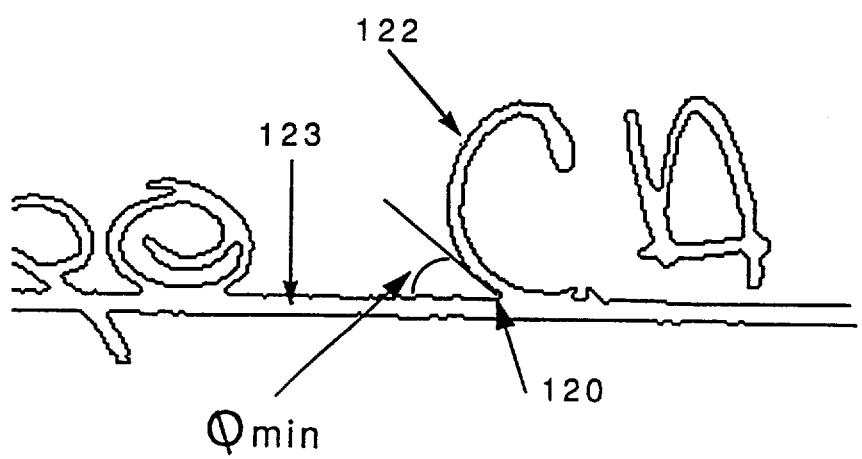
FIG. 14A illustrates diagrammatically a detected turning point and intersecting angle between underline and text.

The intersection angle is defined as the angle between the contour piece and the character strokes that connect to it. To find the intersection angles, the turning points between the guideline pieces and the character strokes are located at step 801. Finding each turning point is an iterative process, illustrated in FIGS. 14A–14D. FIG. 14A shows an example of a turning point 120 between a character 122 ("C") and an underline 123 in an encoded contour image. A pixel 125 along the upper contour near the end of the contour piece which intersects the character is selected, as shown in FIG. 14B. The pixel 126, which is 5 pixels farther away, and the pixel 127, which 5 pixels nearer, are connected to the pixel 125 by line segments 128 and 129, respectively, and an angle $\phi_1$ between these segments is associated with pixel 125. This process is repeated for each pixel approaching the intersection. FIG. 14C shows the process for pixel 127, which is close enough to the intersection that moving 5 pixels in the direction of the character reaches a pixel 130 that is on the character stroke. The line segments 131 and 132 drawn between the three pixel 125, 127 and 130 form an angle $\phi_2$ that is smaller than $\phi_1$. Eventually, a pixel 135 is reached, as shown in FIG. 14D, at which the angle $\phi$ is at a local minimum compared to the angles assigned to all pixels near the intersection. This angle, formed by line segments 138 and 139 connecting pixels 135, 136, and 137, is labelled the intersection angle $\phi_{min}$, and the pixel 135 is labelled the turning point. An intersection angle and turning point are determined for every end of a line contour piece that intersects a character stroke.

Step 802 begins the application of character preserving rules to the contour pieces of the paired clusters by selecting a contour piece for analysis. At step 803, the program determines whether the piece is relatively short (for example: ≦36 pixels). If not, the piece remains in the cluster. If so, at step 804 it is determined (a) whether the piece is either above the fitted centerline of an upper cluster or below the fitted centerline of a lower cluster, and (b) whether the distance of the piece to its cluster is larger than a predetermined portion of the standard deviation of the distances of all pieces of the cluster to the cluster. If so, the piece is considered to be part of a character stroke, and is removed from the cluster at step 805. An example of this is shown in FIG. 15, in which piece 140 has been clustered with cluster 142, but is removed by step 804, preserving a part of the character "E". Then, if all contour pieces have not been analyzed, as determined at step 806, the process returns to step 802 and continues as before with the selection of another piece.

If, at step 804, the tests are not passed, the process goes to step 812 which determines if the piece is from a hole. If so, step 814 determines whether the piece, which is known to be relatively short, has intersecting angles at both ends larger than a predetermined threshold (for example: >112°). If so, the piece likely is part of the bottom of an "O", "8", or "6". This situation is shown in FIG. 16A, where the portion of the "O" touching the underline 144 is relatively short, and both intersecting angles α and β are large. Therefore, the piece 145 is removed from the cluster. As described below, this will result in the portion of the underline below the piece 145 staying in the image to complete the "O". In contrast, FIG. 16B shows an "n" intersecting the underline 144. Even though the character and underline create a hole, a piece 146 between the vertical legs of the character remains with the cluster because the intersection angles α and β are too small.

If the angle test of step 814 is answered in the negative, step 815 determines whether the piece is very short (for example: ≦6 pixels). If not, the piece is left in the cluster. If so, step 816 determines whether either one of the intersection angles of the piece are greater than the large angle threshold used in step 814. If neither intersection angle is large enough, the piece is left in the cluster. If one is larger than the threshold, the piece is likely to be a bottom stroke of a character such as a "D" or "B", and is removed from the cluster so that the associated portion of the guideline will remain in the image to preserve the character.

If step 812 determines that the relatively short piece is not from a hole, then step 818 determines whether the piece is very short (for example: ≦6 pixels). If not, the piece is left in the cluster. If so, step 819 determines whether there are intersection angles at both ends of the piece larger than the large angle threshold (for example: >112°). If not, the piece is left in the cluster. If so, the piece is likely to be a bottom stroke of a "U" or "V" as illustrated in FIG. 17. The piece 150 is quite short and the intersection angles α and β are sufficiently large to pass the test of steps 818 and 819. Therefore, the piece 150 is removed from the cluster.

From the foregoing it will be seen that step 805, removing the piece from a cluster, is activated by positive outputs from steps 804, 814, 816, or 819. Negative outputs from steps 803, 815, 816, 818, or 819 bypass step 805 and go to step 806. When all pieces have been analyzed, step 820 draws lines to connect the remaining paired clusters, as shown in FIG. 18. The lines are drawn from the turning points or end points at the ends of upper and lower clusters perpendicularly across to the other cluster of a pair when the other cluster extends far enough to meet such a line. This results in enclosed regions, shown shaded in FIG. 18, which define guideline segments of a guideline 160. For better accuracy, the crossing lines may be drawn along the intersecting angle from turning points. Examples of enclosed regions joining cluster pairs 161 and 162 of the guideline 160 are shown. At step 821 redundant portions of clusters are removed from guideline segments. For example, a portion $161a_x$ of the upper cluster 161a and a portion $161b_x$ of the lower cluster 161b represent pixels that do not have any match with the other side of the pair, and such portions are removed from the guideline segments. Similarly, extraneous portion $162b_x$ of cluster pair 162 is removed. There may be other small contour portions, such as arcuate ends of guidelines, that are not part of characters, but most of these can be removed by noise filters.

At step 822, a boundary-to-region decoding process is used to fill in the guideline segment regions with foreground pixels. An example of the result is shown in FIG. 5E.

Finally, the line segment subracter 40 simply subtracts the pixels of the guideline segment regions from the original binary image in a conventional manner to remove the guideline segments, as shown in FIG. 5F.

In summary, it will be understood from the foregoing description that the present invention provides an efficient system and method for reliably identifying a large variety of line patterns from images of text, and distinguishing those portions of such lines which touch or intersect character strokes in the image. The present invention provides for removal of guideline segments between character strokes without deleting character strokes. The system and method operate effectively on both machine printed and hand formed text An image of text has most characters separated for more effective subsequent OCR processing, despite the presence of guidelines connecting the characters.

Those skilled in the art will appreciate that many different combinations of hardware will be suitable for practicing the present invention. Many commercially available substitutes, each having somewhat different cost and performance characteristics, exist for each of the physical components listed above. For example, the host computer 30 could be hard-wired logic, reconfigurable hardware, an application specific integrated circuit (ASIC), or some other equivalent means for implementing a set of instructions.

It will be further understood that various changes in the details, materials, and arrangements of the parts and parameters which have been described and illustrated to explain the nature of the invention may be made by those skilled in the art without departing from the principle and scope of the invention as expressed in the following claims.

What is claimed is:

1. A method of identifying a line pattern in an image of text, comprising the steps of:
   locating contours of isolated objects in said image;
   locating line contour pieces in said contours comprising contiguous pixels forming lines of at least a predetermined straightness along at least a first predetermined length;
   designating clusters of said line contour pieces which have at least a first predetermined closeness along a longitudinal direction generally along the length of said line contour pieces and essentially no transverse overlap;

locating pairs of said clusters which are spaced apart transversely and have at least a second predetermined closeness to one another generally along a direction transverse to said longitudinal direction; and eliminating from said clusters those contour pieces that intersect character strokes by:
   finding intersection angles between a contour piece and strokes that connect to it at its ends; and
   designating said contour piece part of a line pattern or part of a character responsive to predetermined relationships between said intersection angles, the length of the contour piece, and the distance from the contour piece to the cluster to which it belongs.

2. The method of claim 1, wherein said step of locating contours of isolated objects in said image comprises chain encoding said objects.

3. The method of claim 2, wherein said step of chain encoding comprises obtaining a chain code following an outer boundary of blobs in said image in a counterclockwise direction and of holes in said image in a clockwise direction.

4. The method of claim 2, wherein said step of locating said line contour pieces in said contours comprises determining pieces of said chain code in which successive short segments form angles with said longitudinal direction less than a predetermined line piece angle threshold.

5. The method of claim 1, wherein said step of designating clusters of said line contour pieces comprises selecting an initial line contour piece, designating said initial piece as an initial cluster, and expanding said initial cluster by adding line contour pieces whose distance from said cluster is less than said first predetermined closeness.

6. The method of claim 5, wherein said initial line contour piece is the longest line contour piece.

7. The method of claim 5, wherein said step of designating clusters of said line contour pieces further comprises beginning a new cluster with a line contour piece that is farther from said cluster than said first predetermined closeness.

8. The method of claim 5, wherein the distance from a contour piece to a cluster is the distance from said contour piece to a straight line fit to points of said cluster.

9. The method of claim 1, wherein said step of finding intersection angles between a contour piece and strokes that connect to it at its ends, comprises the steps of:
   (a) selecting a test pixel near the end of a contour piece;
   (b) locating a pair of neighbor pixels a predetermined number of pixels on either side of said test pixel;
   (c) determining the angle between two line segments connecting the two neighbor pixels, respectively, to the test pixel; and
   iteratively repeating steps (a)–(c) for other pixels near the end of the contour piece until a minimum angle is located.

10. The method of claim 9, wherein said step of designating said contour piece part of a line pattern or part of a character includes the steps of:
   determining whether a contour piece is part of a hole;
   if so, determining whether the intersection angles at both ends of said contour piece are greater than a predetermined angle;
   if both of the intersection angles are greater than the predetermined angle, designating said contour piece part of a character; and
   if both of the intersection angles are smaller than the predetermined angle, designating said contour piece part of a line pattern.

11. A method of removing a line pattern from an image of text, comprising the steps of:
   locating contours of isolated objects in said image;
   locating line contour pieces in said contours comprising contiguous pixels forming lines of at least a predetermined straightness along at least a first predetermined length;
   designating clusters of said line contour pieces which have at least a first predetermined closeness along a longitudinal direction generally along the length of said line contour pieces and essentially no transverse overlap;
   locating pairs of said clusters which are spaced apart transversely and have at least a second predetermined closeness to one another generally along a direction transverse to said longitudinal direction;
   eliminating from said clusters those contour pieces that intersect character strokes by:
      finding intersection angles between a contour piece and strokes that connect to it at its ends;
      designating said contour piece part of a line pattern or part of a character responsive to predetermined relationships between said intersection angles, the length of the contour piece, and the distance from the contour piece to the cluster to which it belongs; and
   removing from the image pixels bounded by said paired clusters.

12. The method of claim 11, wherein said step of removing from the image pixels bounded by said paired clusters comprises filling in space between said paired clusters and removing from said image said filled space and bordering portions of said clusters.

13. A system for identifying a line pattern in an image of text, comprising:
   an imager operative to acquire and store an image of said text; and
   a processor configured to:
      locate contours of isolated objects in said image;
      locate line contour pieces in said contours comprising contiguous pixels forming lines of at least a predetermined straightness along at least a first predetermined length;
      designate clusters of said line contour pieces which have at least a first predetermined closeness along a longitudinal direction generally along the length of said line contour pieces and essentially no transverse overlap;
      locate pairs of said clusters which are spaced apart transversely and have at least a second predetermined closeness to one another generally along a direction transverse to said longitudinal direction; and
      eliminate from said clusters those contour pieces that intersect character strokes by:
         finding intersection angles between a contour piece and strokes that connect to it at its ends; and
         designating said contour piece part of a line pattern or part of a character responsive to predetermined relationships between said intersection angles, the length of the contour piece, and the distance from the contour piece to the cluster to which it belongs.

14. The system of claim 13, wherein said processor locates contours of isolated objects in said image by chain encoding said objects.

15. The system of claim 14, wherein said processor locates said line contour pieces in said contours by determining pieces of said chain code in which successive short segments form angles with said longitudinal direction less than a predetermined line piece angle threshold.

16. The system of claim 13, wherein said processor designates clusters of said line contour pieces by selecting an initial line contour piece, designating said initial piece as an initial cluster, and expanding said initial cluster by adding line contour pieces whose distance from said cluster is less than said first predetermined closeness.

17. The system of claim 10, wherein said initial line contour piece is the longest line contour piece.

18. The system of claim 16, wherein said processor further designates clusters of said line contour pieces by beginning a new cluster with a line contour piece that is farther from said cluster than said first predetermined closeness.

19. The system of claim 16, wherein the distance from a contour piece to a cluster is the distance from said contour piece to a straight line fit to points of said cluster.

20. A system for removing a line pattern from an image of text, comprising:
  an imager operative to acquire and store an image of said text; and
  a processor configured to:
    locate contours of isolated objects in said image;
    locate line contour pieces in said contours comprising contiguous pixels forming lines of at least a predetermined straightness along at least a first predetermined length;
    designate clusters of said line contour pieces which have at least a first predetermined closeness along a longitudinal direction generally along the length of said line contour pieces and essentially no transverse overlap;
    locate pairs of said clusters which are spaced apart transversely and have at least a second predetermined closeness to one another generally along a direction transverse to said longitudinal direction;
    eliminate from said clusters those contour pieces that intersect character strokes, by:
      finding intersection angles between a contour piece and strokes that connect to it at its ends;
      designating said contour piece part of a line pattern or part of a character responsive to predetermined relationships between said intersection angles, the length of the contour piece, and the distance from the contour piece to the cluster to which it belongs; and
    remove from the image pixels bounded by said paired clusters.

21. The method of claim 20, wherein said processor removes from the image pixels bounded by said paired clusters by filling in space between said paired clusters and removing from said image said filled space and bordering portions of said clusters.

22. A method of identifying a line pattern in an image of text, comprising the steps of:
  locating contours of isolated objects in said image;
  locating line contour pieces in said contours comprising contiguous pixels forming lines of at least a predetermined straightness along at least a first predetermined length;
  designating clusters of said line contour pieces which have at least a first predetermined closeness along a longitudinal direction generally along the length of said line contour pieces and essentially no transverse overlap;
  locating pairs of said clusters which are spaced apart transversely and have at least a second predetermined closeness to one another generally along a direction transverse to said longitudinal direction, the closeness of said clusters along said transverse direction being determined by:
    in the case of a first cluster completely transversely overlapping a second cluster, averaging the distances from endpoints of said cluster to a fitted centerline of said first cluster; and
    in the case of said first and said second clusters partly transversely overlapping one another, averaging the distances from overlapped endpoints of each of said clusters to a fitted centerline of the other cluster; and
  eliminating from said clusters those contour pieces that intersect character strokes.

23. A method of identifying a line pattern in an image of text, comprising the steps of:
  locating contours of isolated objects in said image;
  locating line contour pieces in said contours comprising contiguous pixels forming lines of at least a predetermined straightness along at least a first predetermined length, said step of locating said line contour pieces in said contours comprising determining pieces of said chain code in which successive short segments form angles with said longitudinal direction less than a predetermined line piece angle threshold;
  designating clusters of said line contour pieces which have at least a first predetermined closeness along a longitudinal direction generally along the length of said line contour pieces and essentially no transverse overlap;
  locating pairs of said clusters which are spaced apart transversely and have at least a second predetermined closeness to one another generally along a direction transverse to said longitudinal direction;
  designating as defining a line pattern those pairs of clusters spaced apart transversely no more than said second predetermined closeness that comprise oppositely directed pieces of chain code and transversely overlap by at least a predetermined proportion; and
  eliminating from said clusters those contour pieces that intersect character strokes.

24. The method of claim 23, wherein said predetermined proportion is at least one-third.

25. The method of claim 23, further comprising, in the case of paired clusters wherein a first upper cluster is left-directed and a second lower cluster is right-directed, and both an upper right-directed third cluster and a left-directed fourth cluster lie between said first and second clusters, adding said third cluster to said second cluster and pairing a segment removed from said second cluster with said fourth cluster, whereby a line pattern branch is resolved.

* * * * *